(12) United States Patent
Chiesa et al.

(10) Patent No.: US 11,745,398 B2
(45) Date of Patent: Sep. 5, 2023

(54) MULTIPLE-JIG FOAMING APPARATUS AND RELATIVE FOAMING METHOD

(71) Applicant: COSMA S.R.L., Milan (IT)

(72) Inventors: Giuseppe Chiesa, Milan (IT); Bruno Moretti, Milan (IT)

(73) Assignee: COSMA S.R.L., Milan (IT)

( * ) Notice: Subject to any disclaimer, the term of this patent is extended or adjusted under 35 U.S.C. 154(b) by 0 days.

(21) Appl. No.: 17/527,479

(22) Filed: Nov. 16, 2021

(65) Prior Publication Data

US 2022/0168929 A1  Jun. 2, 2022

(30) Foreign Application Priority Data

Dec. 2, 2020  (IT) .................. 102020000029462

(51) Int. Cl.
*B29C 44/34*  (2006.01)
*B29C 44/12*  (2006.01)
*B29L 31/44*  (2006.01)

(52) U.S. Cl.
CPC .......... *B29C 44/34* (2013.01); *B29C 44/1228* (2013.01); *B29L 2031/445* (2013.01)

(58) Field of Classification Search
CPC . B29C 44/34; B29C 44/1228; B29C 44/1233; B29C 44/428; B29L 2031/445
See application file for complete search history.

(56) References Cited

U.S. PATENT DOCUMENTS

| 2008/0029921 | A1* | 2/2008 | Corradi | ............... | B29C 44/3403 425/4 R |
| 2017/0021531 | A1* | 1/2017 | Bazzica | ............... | B29C 33/305 |
| 2018/0133937 | A1* | 5/2018 | Amodeo | ............... | B29C 44/428 |

FOREIGN PATENT DOCUMENTS

| EP | 1778449 | A1 |   | 5/2007 |
| IT | 1203353 | B  |   | 2/1989 |
| KR | 101555898 | B1 | * | 9/2015 |
| WO | 2012/004656 | A1 |   | 1/2012 |
| WO | 2013/054255 | A1 |   | 4/2013 |
| WO | 2016/192991 | A1 |   | 12/2016 |

OTHER PUBLICATIONS

Patent Search Report, European Patent Office, dated Aug. 20, 2021.

* cited by examiner

*Primary Examiner* — Kelly M Gambetta
*Assistant Examiner* — Virak Nguon
(74) *Attorney, Agent, or Firm* — Bay State IP, LLC (57) ABSTRACT

A foaming method and apparatus for products comprising a frame (T) on which a first containment jig mould (1) is supported,
at least one foaming unit, and
a loading trolley (20) provided with a controlled conveyor (21) for transferring said components from an inlet line (Li) inside said containment jig (1), wherein it includes
at least a second containment jig (10) arranged above said first containment jig (1) constrained to the same fixed frame (T),
a removal trolley (30) arranged on the side opposite said loading trolley (20) with respect to said containment jigs (1, 10), between said containment jigs (1, 10) and an outlet line (Lu), wherein
said loading trolley (20) and removal trolley (30) are vertically movable, by means of respective controlled lifts (22, 32), between a lower position and one or more service positions in which they are arranged adjacent to said jigs (1, 10).

9 Claims, 9 Drawing Sheets

MULTIPLE-JIG FOAMING APPARATUS AND RELATIVE FOAMING METHOD

CROSS REFERENCE TO RELATED APPLICATIONS

This application takes priority and claims the benefit of Italian Patent Application No. 102020000029462 filed on Dec. 2, 2020, the contents of which are herein incorporated by reference.

FIELD OF THE INVENTION

The present invention relates to a foaming system for products having paired components, such as body structure of household appliances. In particular, the invention relates to an apparatus provided with several contrast jigs for the foaming operation.

TECHNICAL BACKGROUND

As is known, some types of household appliances require the arrangement of insulating layers between the external casing, typically made of metal sheet, and the internal operative part, typically formed by a shaped shell of plastic material.

In refrigeration cabinets, the insulating layer is an important component for preventing a thermal dispersion between the inside and the outside of the refrigerator. The consolidated construction method includes coupling an internal finishing shell—i.e., the part visible to the user when opening the refrigerator—with an external cabinet casing, normally consisting of a painted metal sheet of parallelepiped shape, and then foaming the insulating material in a gap between the two.

The material which is injected for foaming into the gap is normally an expandable insulating polyurethane, but may also be of another expandable insulating material.

Since the gap has a significant volume, precisely because the injected material must act as an effective insulating layer, significant pressure forces develop during the expansion process of the injected material. To prevent the internal shell and the external cabinet, coupled together, from deforming under the internal pressures during the expansion step of the expandable material, it is provided that they are provisionally engaged in a rigid containment jig (i.e. a kind of mould) during the expansion and crosslinking step of the expandable material. In fact, it is important that the external shell and the cabinet are kept mutually coupled and that the respective surfaces are resting against rigid abutment structures, so as not to collapse under the pressure developed by the expandable material.

Once the crosslinking of the expandable material is terminated, the latter acquires a dimensional stability and no longer exerts any pressure, whereby the set of the internal shell, external cabinet and insulation can be extracted from the containment jig.

Therefore, in the foaming apparatuses of the cabinets of household appliances, it is provided that the internal shell and the external cabinet are mutually coupled and then constrained in an opening and closing containment jig. In particular, the external cabinet is received in the compartment of a first half-jig portion, configured as an open box formwork, formed by five walls which can be opened and locked in position, while the internal shell is engaged by a male element integral with a second half-jig portion provided with a closing lid which is firmly coupled with the first half-jig portion before performing the injection of the expandable material.

Normally the second half-jig portion is fixed in the upper part of a support frame, while the first half-jig portion is arranged in the lower part of the same frame and, once it has received the assembled cabinet of the appliance, it is lifted until it goes into coupling with the second upper half-jig portion. This configuration, called "mouth up" (because the mouth of the internal shell faces upwards), is not the only viable configuration, because some apparatuses include the over/under reversal of the two components, so as to create a "mouth down" configuration.

It is relevant the fact that, on the support frame, the two half-jig portions are mutually approached and then firmly coupled with each other to form a retaining jig structure, to support the expansion of the injected expandable material.

Foaming apparatuses of this type are known, for example, from 11102019000024637 belonging to the same Applicant.

As is known, once the injection of the expanded polyurethane (or other equivalent insulating material) is completed, it is necessary to wait for the expansion and crosslinking times of the expandable material, before being able to reopen and free the jig from the completed product, for example the refrigerator.

The foaming apparatus therefore remains engaged for a long enough time, until the expansion of the insulating material is completed, without being able to perform other functions. This implies as a minimum that the entire footprint of the apparatus on the ground is not occupied with another production process, which constitutes a limit to the productivity of this type of apparatus.

To partially remedy this condition, multiple-jig apparatuses have been proposed in which, on the same support frame, a rotating drum provided with multiple foaming jig is mounted. For example, a plurality (normally 4-7) of half-jig portions with male elements which can be engaged in turn with respective cabinet half-jig portions reaching the foaming station in the lower part of the apparatus can be mounted on the rotating drum.

This type of apparatus has been conceptually known since the 1950s, for example by IT1203353, but also, more recently, for example by WO2006/013002, WO2013/054255 and WO2016/192991.

Although the rotating drum apparatuses have a more efficient occupation of space, they have not been very successful in the field of refrigerator cabinets, because they are complex and, in any case, have a larger footprint than a single apparatus: in fact, the rotation of the drum laterally engages a larger space than the sole footprint of a single jig on the ground.

Furthermore, the cycle of a complete rotation of the drum must be coordinated with the crosslinking times of the specific product.

There are also other simplified apparatuses on the market, where the rotating drum is in the form of a rotating frame provided with a pair of half-jig portions mounted on opposite sides of a rotating shaft: in such a case the rotation occurs in 180° steps and the availability is doubled with equal occupation on the ground.

In any case, the loading of the components and the extraction of the finished product on each jig necessarily occurs in the same position and therefore exclusively on one jig the other.

A method of loading and unloading a mould on a foam machine is disclosed in WO212/4656.

The Applicant has identified room for further improvement of the multiple-jig apparatuses.

BRIEF DESCRIPTION OF THE INVENTION

Therefore, the object of the present invention is to provide a foaming apparatus and operating method for cabinets of household appliances, which solves the above-mentioned problems. In particular, it is desired to provide a multi-jig apparatus which has a reduced footprint, a sufficiently economical and light structure and greater production flexibility.

Such an object is achieved according to the invention by an apparatus and a method having the features defined in essential terms in the main claims attached hereto.

Other preferred features of the invention are defined in the dependent claims.

BRIEF DESCRIPTION OF THE DRAWINGS

Further features and advantages of the invention will anyhow be more evident from the following detailed description of preferred embodiments thereof, provided merely by way of non-limiting examples and illustrated in the accompanying drawings, in which.

DETAILED DESCRIPTION OF PREFERRED EMBODIMENTS

A foaming system is designed for injecting an expandable insulating foam, for example expandable polyurethane, into a gap of products obtained by coupling multiple components, such as typically household appliances cabinets (such as refrigerators) which are obtained by coupling a rear casing with a front shell.

For the sake of simplicity, in the following reference will be made to a foaming system for refrigerators, but it is understood that the apparatus can also be used for similar applications.

In general, the assembly process considered includes that a pair of components—for example an external cabinet case on one side and an internal shell on the other—are assembled together, leaving a gap to be filled with the expandable foam.

In a foaming station a foaming apparatus S is provided which is served by an inlet line Li—along which a plurality of coupled components arrive in sequence—and by an outlet line Lu—along which the assembled products are delivered once the expansion step of the expandable foam is completed.

In the application under consideration, assembled products consisting of an external cabinet case of a refrigerator body with the relative internal shell (schematically illustrated with reference F in FIGS. 6A and 6B) are conveyed on the inlet line Li, for example facing mouth up, but it is not excluded that another component of the product to be assembled can be transferred.

The inlet line Li has a sliding plane which approaches near the foaming apparatus S at a lower level.

The foaming apparatus S consists of a frame T fixed to the ground, on which is supported a foaming jig 1 of generally parallelepiped configuration and typically consisting of a first portion or lower half-jig portion 1a and a second portion or upper half-jig portion 1b which are mutually movable.

The figures show a jig 1 in which the lower portion 1a consists of equipment provided with five movable walls (intended to support the external walls of the refrigerator) and the upper portion 1b consists of equipment provided with an upper movable closing lid provided with a male closing element (intended to support the internal shell of the refrigerator), but it is not excluded that the construction can be reversed.

At least one of the two jig portions, preferably the lower portion 1a (as shown in the figures), is mounted vertically on the frame T, so that it can be approached and removed from the upper portion 1b which is instead mounted fixed (or also partially movable), possibly at adjustable height, on the frame T.

Figure 1A:
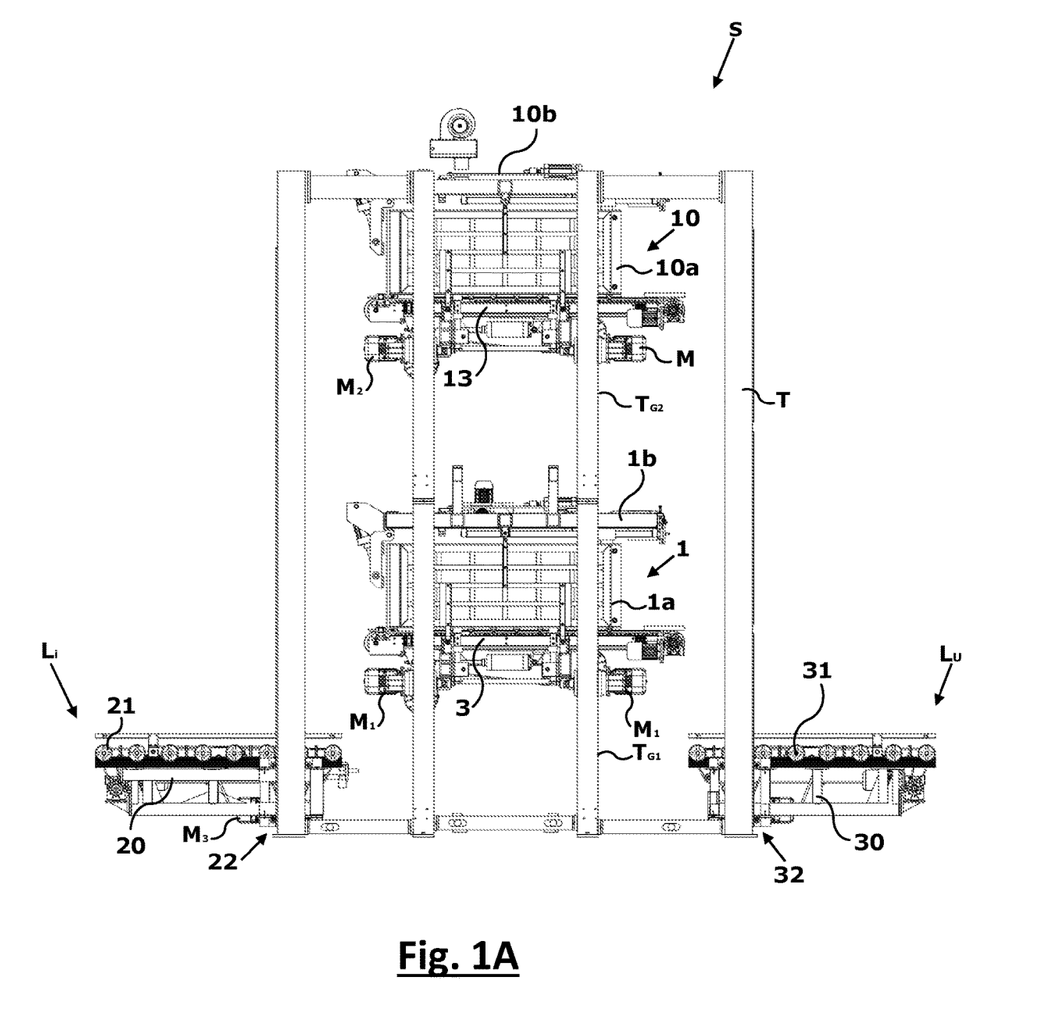
FIG. 1A is an elevational side view of an apparatus according to the invention.
Figure 1B:
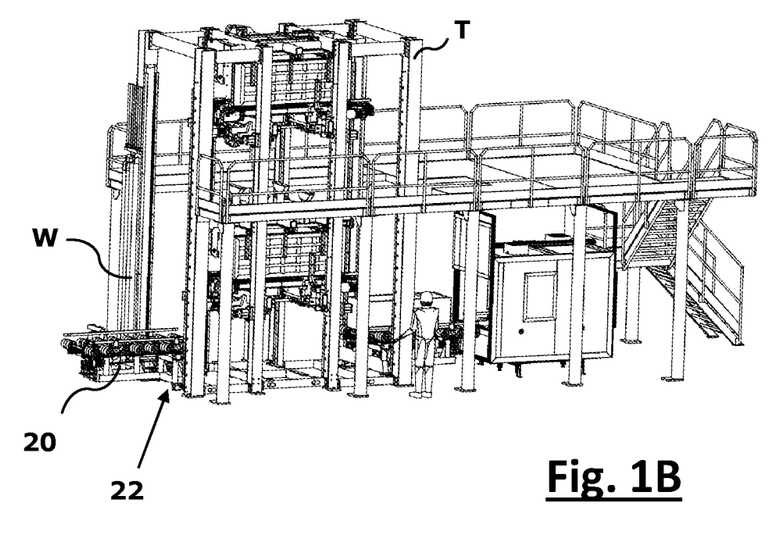
FIGS. 1B and 1C are partial perspective views of a system provided with the apparatus according to the invention and a lifting trolley in two different positions.
Figure 1C:
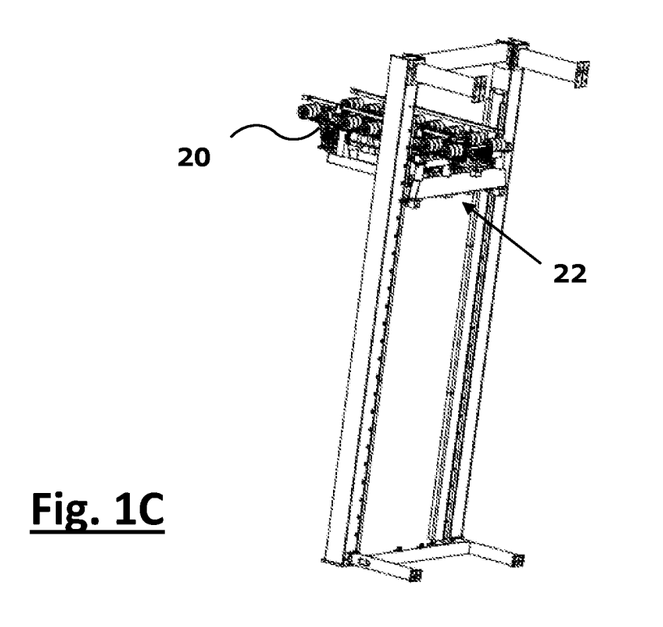
Figure 2:
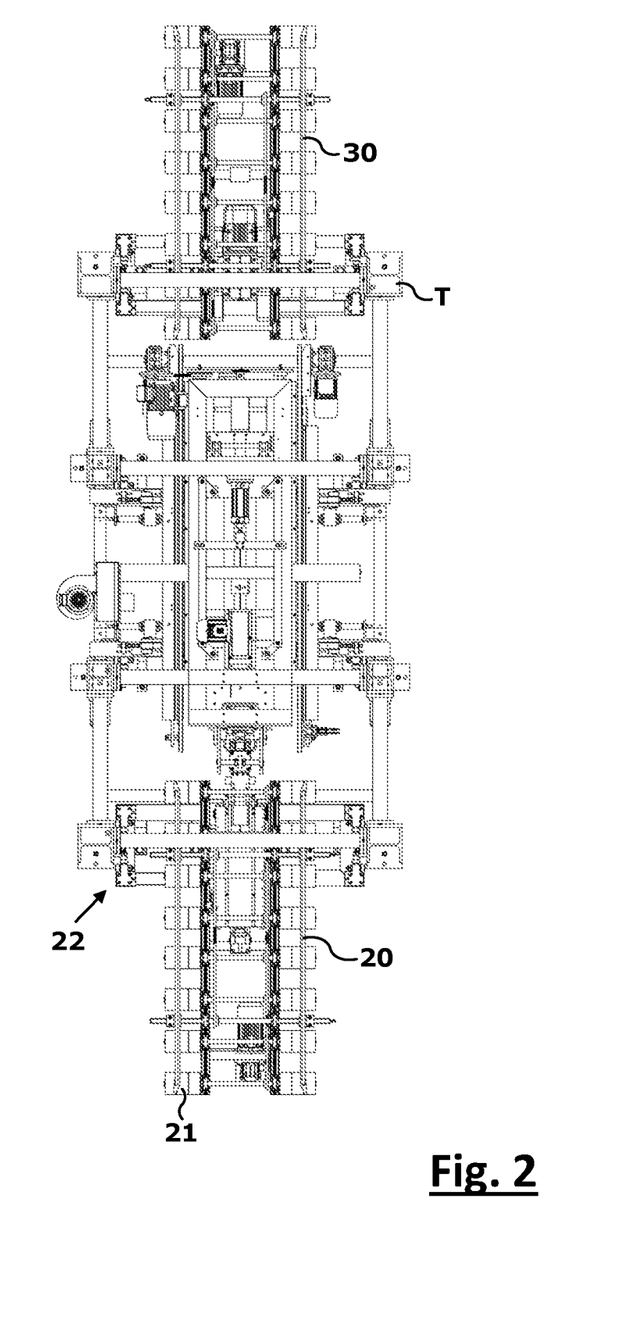
FIG. 2 is a top plan view of the apparatus of FIG. 1A.
Figure 3A:
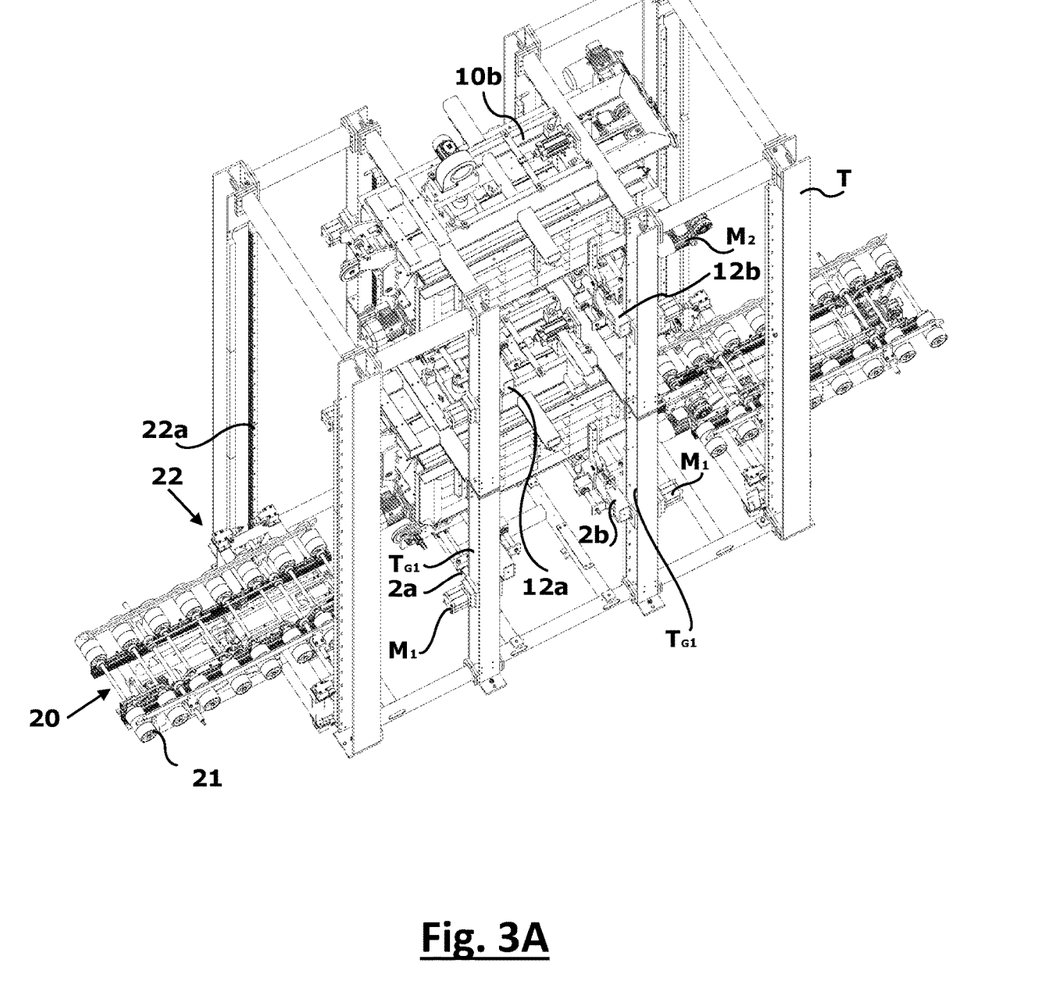
FIGS. 3A and 3B are views according to two different perspectives of the apparatus of FIG. 1A.
Figure 3B:
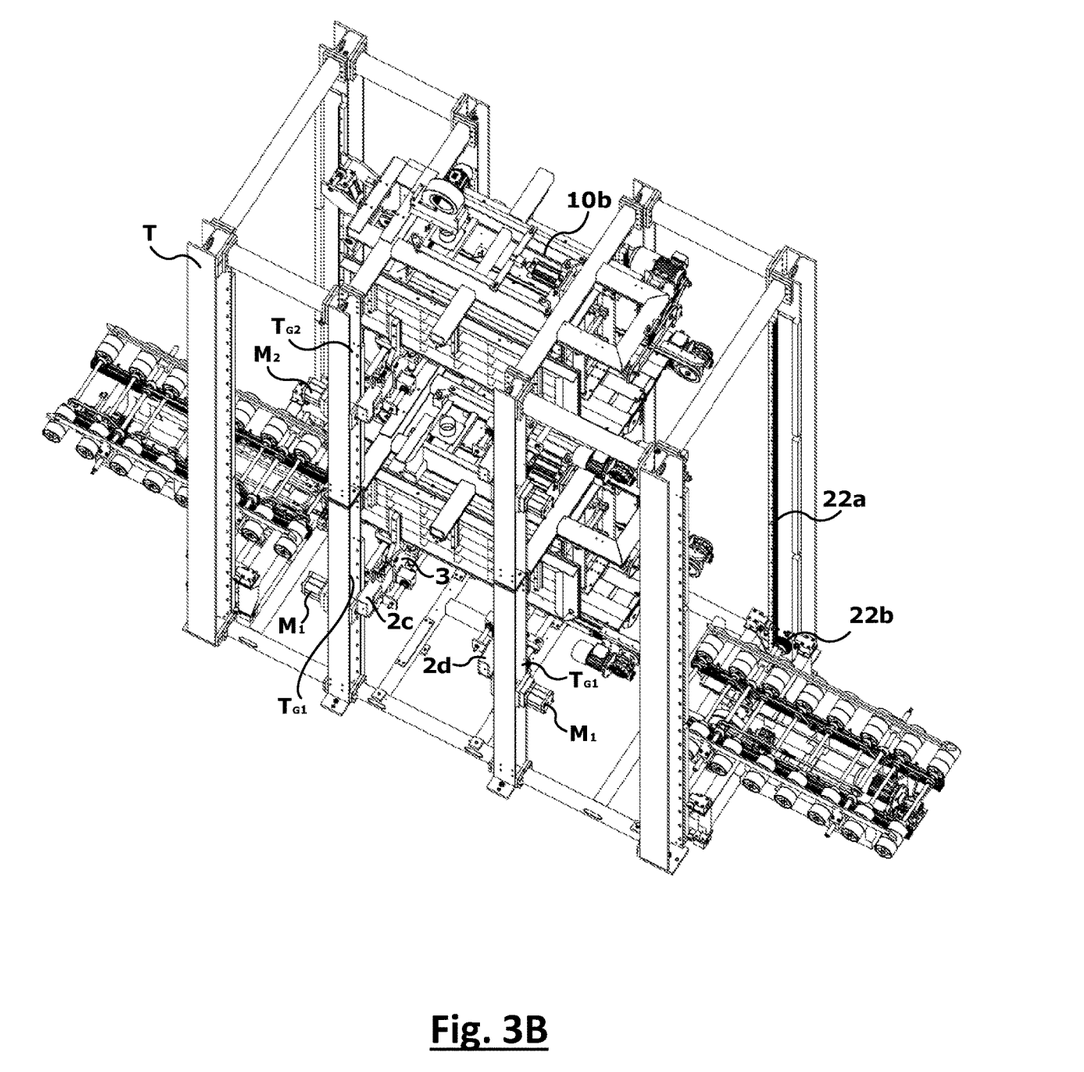
Figure 4:
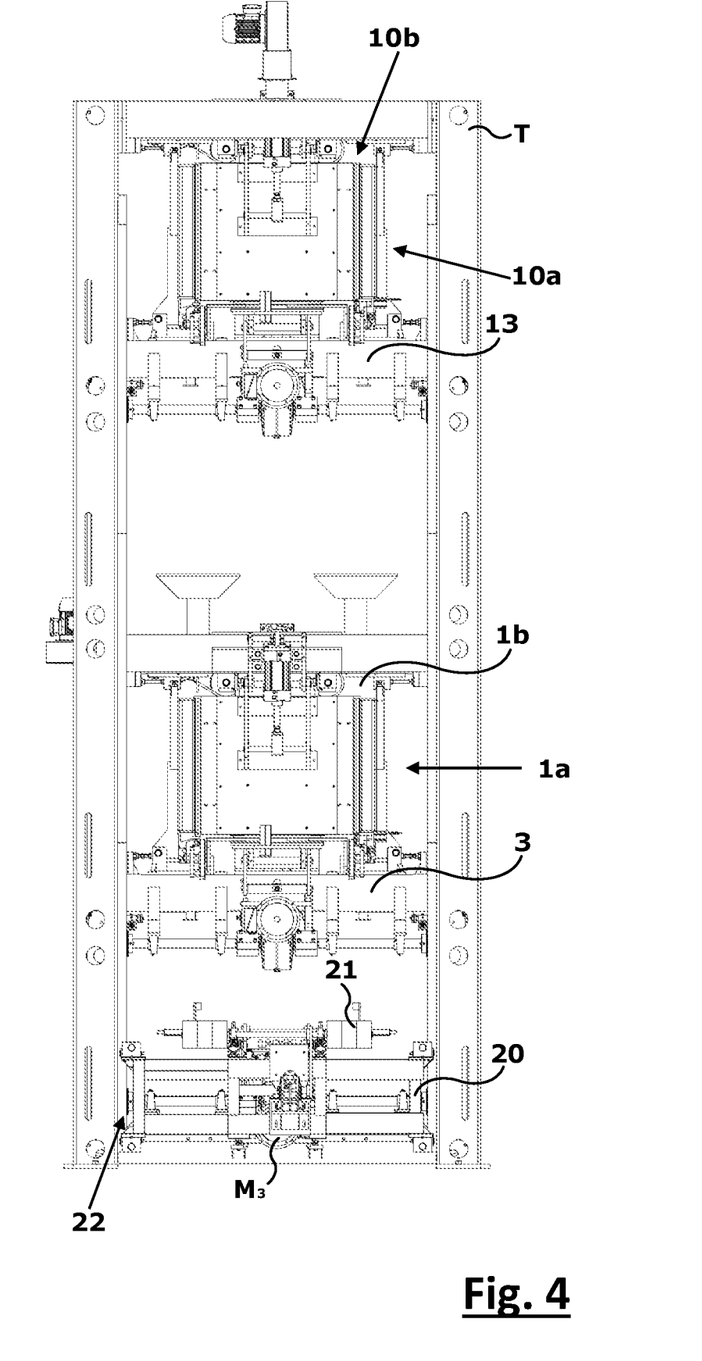
FIG. 4 is an elevational front view of the apparatus of FIG. 1A.

To this end, first vertical and parallel sliding guides $T_{G1}$ are provided on the frame T, along which sliding pads 2a-2d of a vertically sliding slider 3 are mounted, by means of first motor $M_1$. The slider 3 supports the lower portion 1a of the jig 1 and transfers it alternately to an upper position (shown in FIG. 1) and a lower position according to the work program of the apparatus.

According to the invention, on the frame T of the foaming apparatus S, at least a second foaming jig 10 is supported, arranged above the first jig 1 and of an entirely similar configuration, also consisting of a lower portion 10a and an upper portion 10b which are mutually movable.

As for the first lower jig 1, also one of the two portions of the second upper jig 10, preferably the lower portion 10a (as shown in the figures) is mounted vertically movable on the frame T, so as to be able to be approached and removed from the upper portion 10b which is instead mounted fixed (or also movable), possibly at adjustable height, on the frame T.

To this end, second vertical and parallel sliding guides $T_{G2}$ are provided on the frame T, along which sliding pads 12a-12d of a vertically sliding slider 13 are mounted, by means of second motor $M_2$. The slider 13 supports the lower portion 10a of the second jig 10 and transfers it alternately to an upper position (shown in FIG. 1) and a lower position.

The lower position taken by the slider 13 of the lower upper jig portion 10a is in any case higher than the upper portion 1a of the first jig 1.

The first $T_{G1}$ and the second $T_{G2}$ sliding guides are preferably aligned with each other—for example on the same upright of the frame T, as shown in the figures—and may also coincide.

Figure 5:
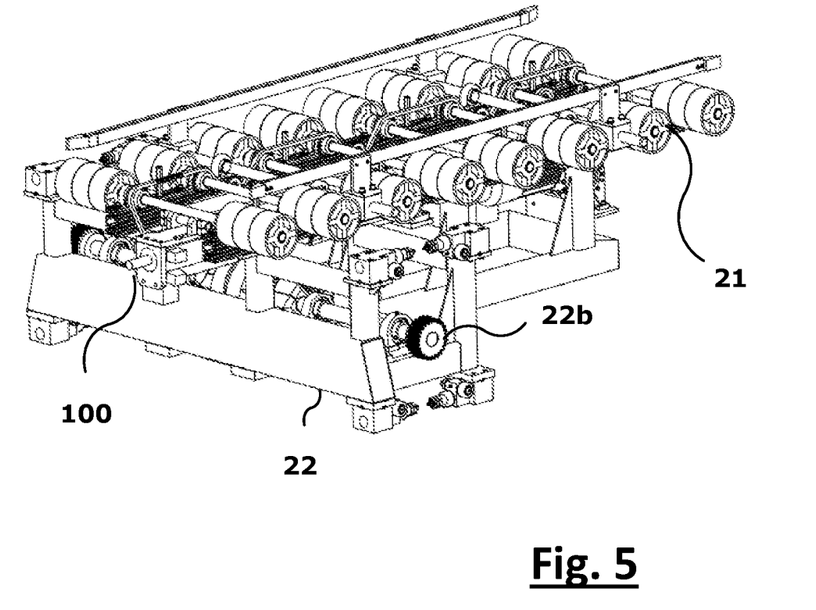
FIG. 5 is a perspective view of a lifting loading trolley.

According to a further peculiar feature of the invention, between the inlet line Li and the apparatus S a first loading trolley 20 is provided for loading (shown in detail in FIG. 5); similarly, between the foaming apparatus S and the outlet line Lu a second lifting trolley 30 for unloading is provided.

The first lifting trolley 20 for loading is arranged to receive the components of the product to be completed— typically the assembled unit F of external cabinet case and internal shell of a refrigerator—which arrives from the inlet line Li and transfer it within one of the jigs 1 or 10. To this end, the loading trolley 20 has at least one controlled linear conveyor 21, for example a motorized-movement roller conveyor, and a controlled lifter 22 which moves the trolley 20 to the appropriate height to serve the desired lower 1 or upper 10 jig.

In the embodiment shown in the figures, the controlled lifter 22 comprises a double-vertical rack guide 22*a*, integral with the frame T, in which toothed wheels 22*b* of a slide unit integral with the trolley 20 are engaged. The rotation of the toothed wheels 22*b*, by means of a third motor $M_3$, produces the vertical movement of the trolley 20 along the frame T, which can therefore be moved to the desired height according to the work step.

According to the preferred embodiment shown—in the condition in which the trolley 20 and the slider 3 are in their lower position—it is provided that a working plane of the controlled linear conveyor 21 is at the same height as the inlet line Li and an inlet plane of the lower jig 1. Thereby, the product to be loaded into the lower jig 1 can be transferred horizontally from the inlet line Li directly into the lower portion 1*a* of the lower jig 1.

When it is instead necessary to load a product into the upper jig 10, it is provided that it rests on the loading trolley 20, is then transferred vertically to the height of the upper slider 13 and then loaded horizontally into the lower portion 10*a* of the upper jig mould 10.

Similarly, from the outlet side of the foaming apparatus S, it is provided that the second lifting trolley 30 alternatively serves the upper jig mould 10 or the lower one 1 to receive the injected product, after crosslinking of the expandable material, and transfer it to the outlet line Lu.

To this end, the second lifting trolley 30 also has a controlled linear conveyor 31, for example a motorized-movement roller conveyor, and a controlled lifter 32 which transfers the trolley 30 to the appropriate height to serve the desired jig mould.

The controlled conveyor 31 of the second lifting or removal trolley 30 can be completely similar to that of the first lifting or loading trolley 20 and will therefore not be further described.

Finally, the foaming apparatus S is provided with an expandable foam conveying system, provided with at least two adduction lines of the reaction components, a mixing head and an injector.

Although an injector can be provided near each lower 1 and upper jig mould 10, according to a preferred embodiment, a single foam injector 100 integral with the loading trolley 20 (see FIG. 5) is provided on its front side. Thereby, when the loading trolley 20 is adjacent to the jig mould 1 or 10 in which it has just transferred the component to be processed, it has simultaneously also brought the injector 100 into the correct position, which can thus complete the injection operation before the loading trolley 20 returns to the lower position or to serve the other jig. In this case, the expandable foam adduction lines may run in a flexible guide W, in which the control cables of the controlled lifter 22 are also located.

Alternatively, the foam injector may be moved between one jig and the other one using the same vertical guides 22*a* of the loading trolley 20 and possibly an autonomous movement command.

The foaming procedure includes the following general steps.

A component to be injected, for example the external cabinet of a refrigerator coupled through a gap to the internal shell, is pushed along the inlet line Li and placed on the linear conveyor 21 of the loading trolley 20. If the free jig is the lower jig 1, the controlled linear conveyor 21 transfers the external cabinet into the lower portion 1*a* of the foaming jig 1. Once the jig 1 is closed, firmly coupling the upper portion 1*b* with the lower portion 1*a*, the operation of injecting the foam into the gap between the external cabinet and the internal shell is performed.

While the crosslinking of the expandable foam is completed, the loading trolley 20 is returned to its standby position and receives a new product, which is transferred to the second upper jig 10. Once the upper jig 10 is completed and closed, the relative injection step is initiated.

In the meantime, or immediately after, depending on the crosslinking times, the removal trolley 30 is placed alongside the lower jig 1, from where it picks up the finished product and then transfers it to the outlet line Lu.

Once the lower jig 1 has been emptied, the removal trolley 30 is lifted to the height of the upper jig 10 to pick up the other product which in the meantime has also finished expanding the expandable foam.

Then the cycle may resume identically.

The intervention times of the two loading 20 and removal 30 trolleys are appropriately coordinated and optimized depending on the expansion and crosslinking times of the insulating foam and the rate of arrival of the components along the inlet line Li.

Figure 6A:
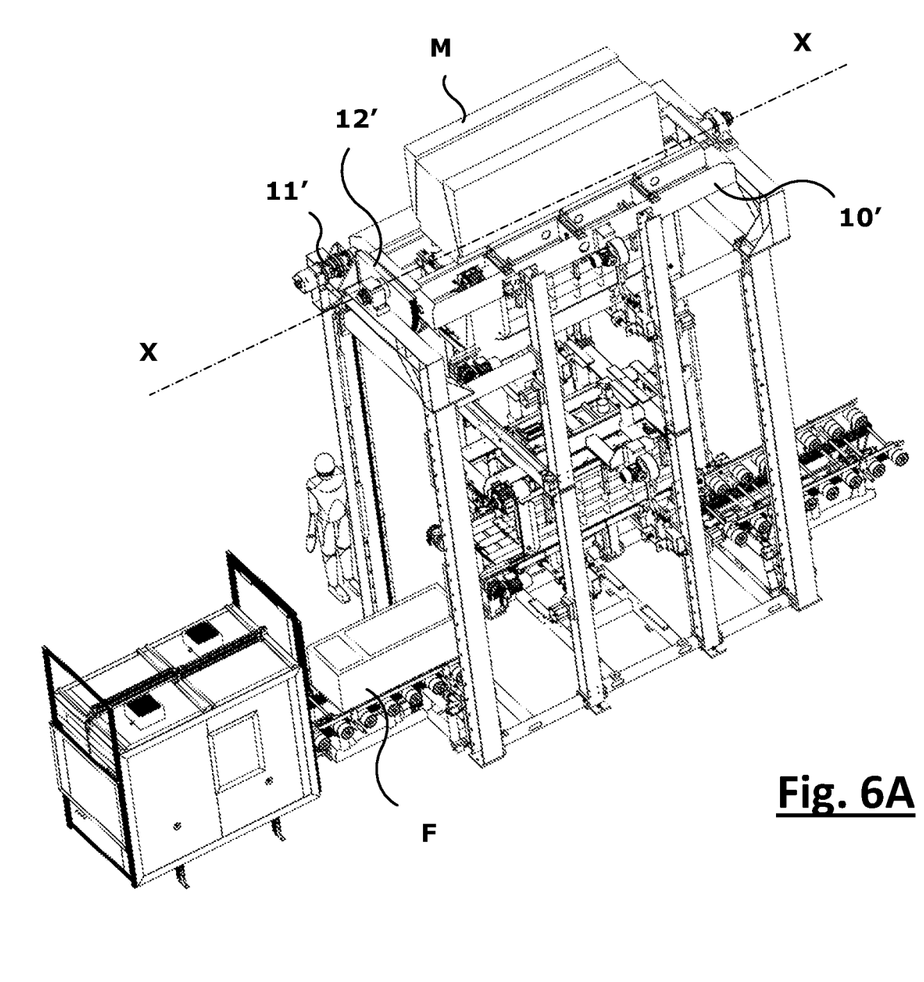
FIG. 6A is a perspective view of a second embodiment of the invention with parts removed.
Figure 6B:
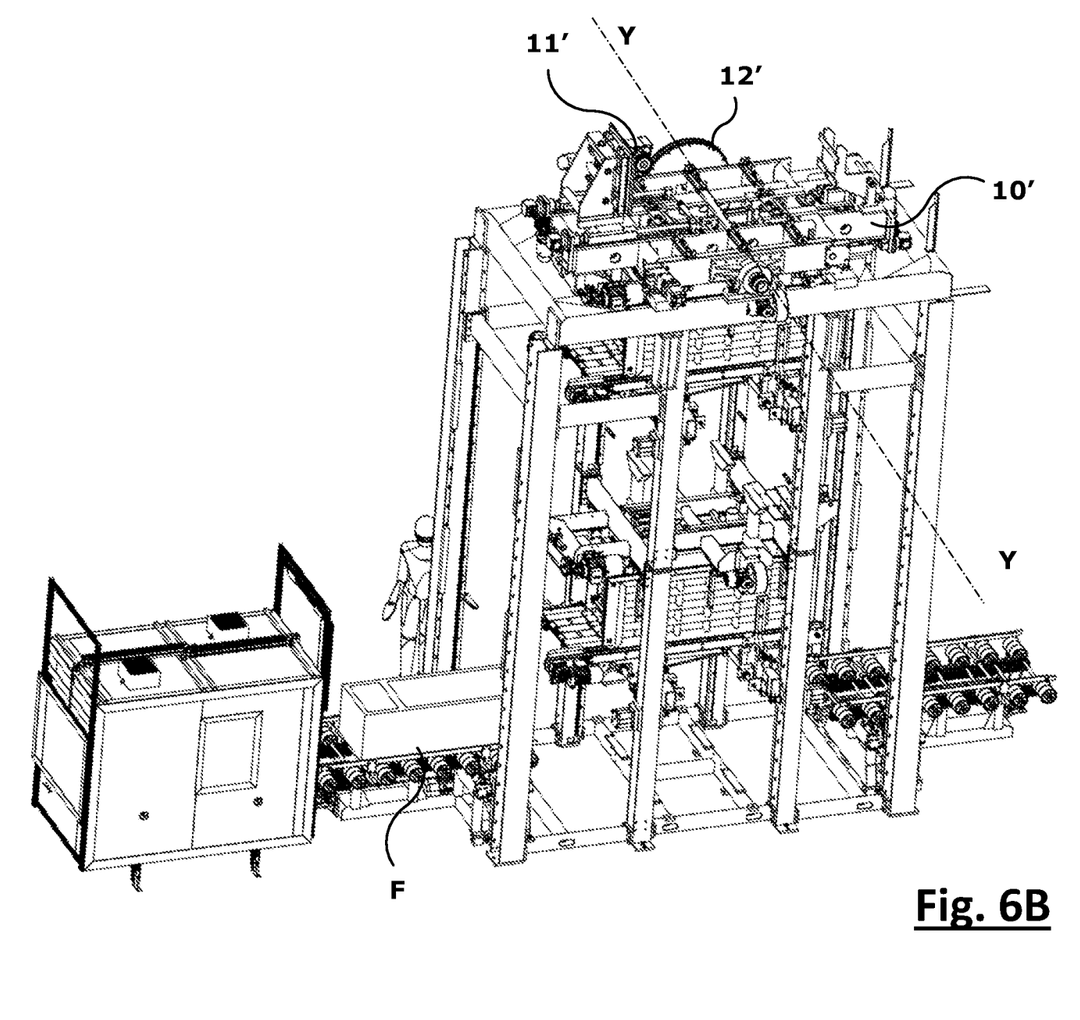
FIG. 6B is a perspective view of a third embodiment of the invention with parts removed.

Modified embodiments are shown in FIGS. 6A and 6B, in which at least the upper jig has a more complex configuration. In particular, it is provided that the upper portion of the upper jig is equipped with a main lid body 10' rotatably mounted along a horizontal axis on the frame T of the foaming apparatus S. Furthermore, the rotatable main lid body 10' supports two male closing elements M (an example is shown in FIG. 6A, while it is not illustrated in FIG. 6B) on the two opposite sides of a rotation plane.

Thereby, the upper portion of the upper jig 10 can be rotated to change the male closing element in use and thus have two different alternatives to be able to complete the foaming of two different products.

In the variant of FIG. 6A the upper portion of the jig 10 is rotatable about a longitudinal rotation axis X-X, while in FIG. 6B the upper portion of the jig 10 is rotatable about a transverse rotation axis Y-Y. The controlled rotation of the upper portion of the jig 10 can occur by means of a gear motor 11' provided with a relative command pinion geared on a toothed half wheel 12' mounted coaxial to the rotation axis X-X or Y-Y and integral with the main lid body 10'.

As can be understood from the description provided above, the technical solution herein offered allows to fully achieve the objects stated in the introduction.

In fact, using foaming jigs and a substantially traditional foaming technique, it is possible to provide a multiple-mould foaming apparatus, without the need to arrange complex rotating drums. The footprint on the ground is exactly the same as that of a single-jig foaming machine and the structure is simple and inexpensive, except for the fact of having to include at least a second jig above the first one.

Since the loading and removal of the products to and from the machine do not occur in the same position, it is possible to operate simultaneously on several jigs, eliminating further dead times.

Again, since the operation of the two jigs is completely independent, the apparatus is potentially usable even with only one of the jigs, which allows for possible repair or maintenance on one of the jig moulds while the apparatus can continue to operate regularly with the remaining jig.

It is understood, however, that the invention is not to be considered as limited by the particular arrangements illustrated above, which represent only exemplary implementations of the same, but different variants are possible, all within the reach of a person skilled in the art, without departing from the scope of the invention itself, which is exclusively defined by the following claims.

For example, as mentioned, the "mouth up" jig configuration shown in the drawings is not binding for the teachings herein and may therefore also be different.

The total number of the jigs is not limited to two, but depending on the size of the products and the needs of the specific application, three or more vertically overlapping jigs can also be included.

Furthermore, the liftable trolleys, for loading and removing of the products to and from the jigs, can also assume very different forms.

What is claimed is:

1. A foaming apparatus (S) for products having sandwiched components, comprising:
    a fixed frame (T) on which a first containment jig (1) is supported,
    at least one foaming unit, and
    a loading trolley (20) provided with a controlled conveyor (21) for transferring said components from an inlet line (Li) inside said containment jig (1), and further including
    at least a second containment jig (10) arranged above said first containment jig (1) constrained to the same fixed frame (T),
    a removal trolley (30) arranged on the side opposite said loading trolley (20) with respect to said containment jigs (1, 10), between said containment jigs (1, 10) and an outlet line (Lu), characterized in that
    said loading trolley (20) and removal trolley (30) are vertically independently movable on said fixed frame (T), by means of respective controlled lifters (22, 32), between a lower position and one or more service positions in which they are arranged adjacent to an inlet and outlet side of said jigs (1, 10) respectively.

2. The foaming apparatus according to claim 1, wherein said jigs (1, 10) are mounted on said frame (T) on which parallel vertical guides (22a) are also arranged along which said vertically mounted trolleys (20, 30) slide.

3. The foaming apparatus according to claim 2, wherein each of said jigs (1, 10) comprises a first external portion (1a) of said jig and a second mutually approachable internal male portion (1b) of said jig.

4. The foaming apparatus according to claim 3, wherein said first external portion (1a) and/or said second internal male portion (1b) are movably mounted along vertical guides ($T_{G1}$, $T_{G2}$) integral with said frame (T).

5. The foaming apparatus according to claim 3, wherein said second internal male portion (1b) is arranged above said respective first external portion (1a).

6. The foaming apparatus according to claim 5, wherein said second internal male portion (1b) is provided with a main lid body (10'), rotatably mounted according to a horizontal rotation axis (X-X, Y-Y), provided with two different male elements (M) placed on two opposite parts of a plane of symmetry passing through said horizontal rotation axis (X-X, Y-Y).

7. The foaming apparatus according to claim 1, wherein said foaming unit has an injector (100) mounted integral with one of said vertically movable mounted trolleys (20, 30).

8. The foaming apparatus according to claim 1, wherein said removal trolley (30) is also provided with a respective controlled conveyor (31).

9. A method for foaming cabinets of household appliances, the method comprising the steps of:
    coupling together a household appliance shell and a cabinet to obtain a product and closing said product in a containment jig (1, 10),
    injecting expandable insulating material into a gap between said household appliance shell and cabinet of said product by means of a foaming unit,
    allowing said expandable insulating material to expand before reopening said containment jig (1, 10) and expelling said product,
    wherein the method is performed in an apparatus according to claim 1, in that said step of allowing the insulating material to expand in a containment jig (1) occurs while said steps of closing said product and injecting occur on a further household appliance shell and cabinet housed in a second containment jig (10) arranged above or below the first, said first (1) and second (10) containment jig being served by a loading trolley (20) and a removal trolley (30) opposite each other, with respect to said jigs (1, 10), which are vertically independently movable.

* * * * *